(12) United States Patent
Zhang

(10) Patent No.: US 7,443,151 B2
(45) Date of Patent: Oct. 28, 2008

(54) FAN SPEED CONTROLLING CIRCUIT

(75) Inventor: Xiang Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 208 days.

(21) Appl. No.: 11/308,815

(22) Filed: May 11, 2006

(65) Prior Publication Data
US 2007/0057653 A1 Mar. 15, 2007

(30) Foreign Application Priority Data
Sep. 9, 2005 (CN) .................... 2005 1 0037203

(51) Int. Cl.
*G05F 1/40* (2006.01)
*H02P 1/00* (2006.01)

(52) U.S. Cl. ..................... 323/282; 318/268

(58) Field of Classification Search .......... 323/265, 323/268, 270, 271, 273, 275, 280, 281, 282, 323/285; 318/254, 268; 307/116, 117, 125, 307/130; 361/688, 695
See application file for complete search history.

(56) References Cited

U.S. PATENT DOCUMENTS

| 4,382,218 | A | 5/1983 | McVey |
| 5,942,866 | A * | 8/1999 | Hsieh .................. 318/268 |
| 6,400,045 | B1 | 6/2002 | Hosokawa et al. |
| 6,879,120 | B2 * | 4/2005 | Xi .................. 318/400.01 |
| 7,323,837 | B2 * | 1/2008 | Wang .................. 318/268 |

* cited by examiner

*Primary Examiner*—Matthew V Nguyen
(74) *Attorney, Agent, or Firm*—Wei Te Chung

(57) ABSTRACT

A fan speed controlling circuit includes a temperature sensing circuit for transforming a temperature signal to a voltage signal, a reference voltage providing circuit for outputting a reference voltage, and a voltage amplifying and comparing circuit. The voltage amplifying and comparing circuit includes a negative terminal receiving the voltage signal from the temperature sensing circuit and a positive terminal receiving the reference voltage from the reference voltage providing circuit. A reactive circuit is connected to the voltage amplifying and comparing circuit. The reactive circuit produces a control signal according to a voltage signal output by the voltage amplifying and comparing circuit. The reactive circuit includes a driving component controlled by the control signal for providing a driving current to a fan.

15 Claims, 1 Drawing Sheet

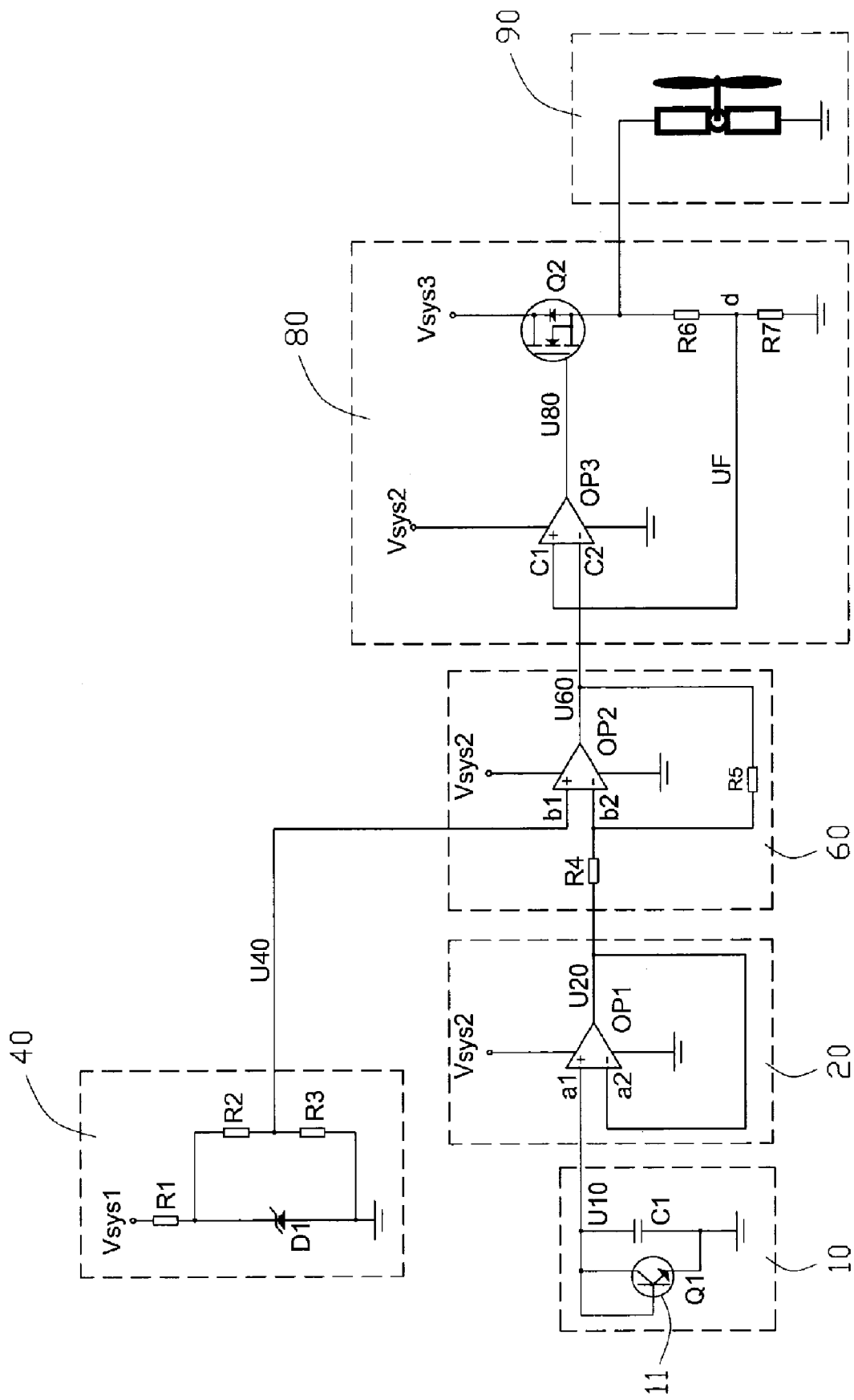

FAN SPEED CONTROLLING CIRCUIT

FIELD OF THE INVENTION

The present invention relates to fan speed controlling circuits, more particularly to a fan speed controlling circuit which can drive a large power fan and control the fan speed according to temperature variations in a computer enclosure.

DESCRIPTION OF RELATED ART

With the development of the computer industry, operating frequencies of most components in computer systems becomes higher and higher, and the heat generated by these components becomes greater as well. If the heat is not dispelled in a timely fashion, the computer system may be seriously damaged. So, a fan is usually used for preventing the temperature in the computer system from becoming too high. Generally, the faster the fan speed is, the better the effect of dispelling the heat. However, greater, fixed fan speeds add noise use a lot of energy which is wasteful and unnecessary during those times when the heat generated within a computer enclosure is not so great. So, it is necessary to control the fan speed.

A conventional fan speed control circuit generally comprises an integral circuit and an amplifier. The integral circuit is used as a control module for controlling the amplifier to drive a fan. However, the working current of a fan for cooling a central processing unit (CPU) is higher than 2A, and the amplifier cannot provide enough working current to drive the fan properly. Additionally, during times when the heat generated within the computer system is small, reducing the fan speed properly will save energy and reduce noise produced by the fan.

What is needed, therefore, is a fan speed controlling circuit which can drive a high powered fan and control the fan speed according to the temperature variations in the computer enclosure.

SUMMARY OF INVENTION

A fan speed controlling circuit includes a temperature sensing circuit for transforming a temperature signal to a voltage signal, a reference voltage providing circuit for outputting a reference voltage, and a voltage amplifying and comparing circuit. The voltage amplifying and comparing circuit includes a negative terminal receiving the voltage signal from the temperature sensing circuit and a positive terminal receiving the reference voltage from the reference voltage providing circuit. A reactive circuit is connected to the voltage amplifying and comparing circuit. The reactive circuit produces a control signal according to a voltage signal output by the voltage amplifying and comparing circuit. The reactive circuit includes a driving component controlled by the control signal for providing a driving current to a fan.

Other advantages and novel features will be drawn from the following detailed description of preferred embodiments with attached drawings, in which:

BRIEF DESCRIPTION OF DRAWINGS

The drawing is a circuit diagram of a fan speed controlling circuit in accordance with a preferred embodiment of the present invention;

DETAILED DESCRIPTION

Referring to the drawing, a fan speed controlling circuit in accordance with a preferred embodiment of the present invention, includes a temperature sensing circuit 10, a voltage follower circuit 20, a reference voltage providing circuit 40, a voltage amplifying and comparing circuit 60 and a reactive circuit 80.

The temperature sensing circuit 10 includes a temperature sensor 11. In the present embodiment, the temperature sensor 11 is an NPN type audion Q1. A base electrode and a collector electrode of the NPN audion Q1 are connected together for functioning as a diode. The emitter electrode of the NPN audion Q1 is connected to ground. A capacitor C1 is connected between the emitter and the collector of Q1, for stabilizing the voltage from the collector. In another embodiment, the temperature sensor 11 can be a PNP audion, and a base electrode and an emitter electrode of the PNP audion are connected together to function as a diode. The temperature sensor 11 can also be a diode.

The voltage follower circuit 20 includes a first amplifier OP1. A positive terminal a1 of the amplifier OP1 is connected to an output terminal of the temperature sensing circuit 10 for receiving a voltage signal U10. A negative terminal a2 of the amplifier OP1 is connected to an output terminal of the amplifier OP1 for receiving a voltage signal U20 output by the voltage follower circuit 20. The voltage follower circuit 20 is preferably used because of having the characteristic of high input impedance and low output impedance allowing the voltage signal U10 to be passed without voltage attenuation.

The reference voltage providing circuit 40 includes a voltage stabilizing diode D1. An anode of the voltage stabilizing diode D1 is connected to a ground voltage. A cathode of the voltage stabilizing diode D1 is connected to a first resistor R1 for limiting the current flowing through the voltage stabilizing diode D1. A working voltage Vsys1 is provided to the reference voltage providing circuit 40 via the first resistor R1. A second resistor R2 and a third resistor R3 are connected in series, and then further connected with the voltage stabilizing diode D1 in parallel, for sharing a voltage between the anode and the cathode of the voltage stabilizing diode. A constant reference voltage U40 is output by a common terminal of the second resistor R2 and the third resistor R3.

The voltage amplifying and comparing circuit 60 includes a fourth resistor R4 and a second amplifier OP2. The output terminal of the voltage follower circuit 20 is connected to a negative terminal b2 of the amplifier OP2 via the fourth resistor R4. An output terminal of the second amplifier OP2 is connected to the negative terminal b2 via a fifth resistor R5, for sending the voltage signal U60 output by the second amplifier OP2 back to the negative terminal b2. The reference voltage U40 from the common terminal of the second resistor R2 and the third resistor R3 is output to a positive terminal b1 of the second amplifier OP2, for comparing with the voltage input in the negative terminal b2 of the second amplifier OP2.

The reactive circuit 80 includes a third amplifier OP3, A MOSFET (metallic oxide semiconductor field effect transistor) Q2, a sixth resistor R6, and a seventh resistor R7. The output terminal of the comparing and amplifying circuit 60 is connected to a negative terminal c2 of the third amplifier OP3. An output terminal of the third amplifier OP3 is connected to a grid electrode of the MOSFET Q2 for providing a voltage signal U80 thereto. A driving voltage Vsys3 is provided to a drain electrode of the MOSFET Q2 by the computer system. The sixth resistor R6 is connected between a source electrode of the MOSFET Q2 and an end of a seventh resistor R7. The other end of the seventh resistor R7 is connected to ground. A common terminal d of the sixth resistor R6 and seventh resistor R7 is connected to a positive terminal c1 of the third amplifier OP3 for sending a feedback voltage UF to the positive terminal c1. The source electrode of the MOSFET is connected to a power input terminal of a fan 90 for providing a working voltage to the fan 90.

At the beginning, the computer system starts up and is working at a normal temperature. The voltage signal U10 output by the temperature sensing circuit 10 is low. The voltage signal U10 is sent to the voltage follower circuit 20. Therein U10 is transformed to be U20 acting on the negative terminal b2 of the voltage amplifying and comparing circuit 60. The voltage signal U20 is amplified and compared with the reference voltage U40. Because the voltage signal U10 output by the temperature sensing circuit 10 is low, the reference voltage U40 is higher than the voltage input to the negative terminal of the second amplifier OP2. Then the voltage amplifying and comparing circuit outputs a higher voltage signal U60. The voltage signal U60 is sent to the negative terminal of the third amplifier OP3 for comparing with the feedback voltage UF sent to the positive terminal. Because the signal input to the negative terminal is higher, the voltage signal U80 output by the third amplifier OP3 becomes lower. Then, the voltage difference between the grid electrode and the source electrode of the MOSFET Q2 becomes less. The current flowing through the drain electrode of the MOSFET Q2 and the fan 90 becomes less too, thereby reducing the rotating speed of the fan 90.

When the temperature in the computer enclosure becomes higher, the voltage U10 from the temperature sensing circuit becomes higher. The voltage signal U10 is sent to the negative terminal of the voltage amplifying and comparing circuit 60 by the voltage follower circuit 20. The constant reference voltage U40 output by the reference voltage providing circuit 40 is sent to the positive terminal of the second amplifier OP2. With the rising of the temperature in the computer enclosure, the voltage signal input to the negative terminal of the second amplifier OP2 becomes higher than the reference voltage U40. So, the voltage amplifying and comparing circuit 60 outputs a lower voltage signal U60. The voltage signal U60 is sent to the negative terminal of the third amplifier OP3 for comparing with the feedback voltage UF sent to the positive terminal of the third amplifier OP3. Because the voltage sent to the negative terminal of the third amplifier OP3 is lower, the voltage signal U80 output by the third amplifier becomes higher. Then, the voltage difference between the grid electrode and the source electrode of the MOSFET Q2 becomes greater. The current flowing through the drain electrode of the MOSFET Q2 and the fan 90 becomes greater too, thereby increasing the rotating speed of the fan 90.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fan speed controlling circuit, comprising:
a temperature sensing circuit for transforming a temperature signal to a voltage signal;
a reference voltage providing circuit for outputting a reference voltage;
a voltage amplifying and comparing circuit comprising a negative terminal receiving the voltage signal from the temperature sensing circuit and a positive terminal receiving the reference voltage from the reference voltage providing circuit;
a voltage follower circuit connected between the temperature sensing circuit and the voltage amplifying and comparing circuit for transferring the voltage signal to the voltage amplifying and comparing circuit without attenuation; and
a reactive circuit connected to the voltage amplifying and comparing circuit, the reactive circuit producing a control signal according to a voltage signal output by the voltage amplifying and comparing circuit, the reactive circuit comprising a driving component controlled by the control signal for providing a driving current to a fan.

2. The fan speed controlling circuit as described in claim 1, wherein the driving component is a MOSFET, a grid electrode of the MOSFET receiving the control signal, a drain electrode of the MOSFET connected to a power source, and a source electrode of the MOSFET outputting the driving current to the fan.

3. The fan speed controlling circuit as described in claim 2, wherein the reactive circuit further comprises an amplifier connected to the grid electrode of the MOSFET.

4. The fan speed controlling circuit as described in claim 3, wherein the reactive circuit further comprises two resistors connected to the source electrode of the MOSFET, the two resistors connected in series, and the common terminal of the two resistors connected to the positive terminal of the amplifier.

5. The fan speed controlling circuit as described in claim 1, wherein the temperature sensing circuit comprises an NPN audion transistor, and a base electrode and a collector electrode of the NPN audion transistor are connected together so that the transistor functions as a diode.

6. The fan speed controlling circuit as described in claim 5, wherein a capacitor is connected between the emitter electrode and the collector electrode of the NPN audion transistor for stabilizing the voltage output therefrom.

7. The fan speed controlling circuit as described in claim 1, wherein the reference voltage providing circuit comprises a stabilizing diode and two resistors connected in series, the two resistors are connected with the stabilizing diode in parallel, the reference voltage is output by a common terminal of the two resistors.

8. The fan speed controlling circuit as described in claim 1, wherein the voltage amplifying and comparing circuit comprises a second amplifier, a resistor connected to the negative terminal of the second amplifier and a resistor connected between an output terminal and the negative terminal of the second amplifier.

9. A fan speed controlling circuit, comprising:
a transistor;
a first amplifier having a positive terminal, a negative terminal and an output terminal, the positive terminal connected to the transistor, the negative terminal connected to the output terminal;
a second amplifier having a positive terminal, a negative terminal, and an output terminal, the positive terminal receiving a reference voltage, the negative terminal connected to the output terminal;
a third amplifier having a positive terminal, a negative terminal, and an output terminal, the negative terminal connected to the output terminal of the second amplifier, the positive terminal receiving a feedback voltage; and
a MOSFET connected to the third amplifier for outputting a driving current to a fan.

10. The fan speed controlling circuit as described in claim 9, wherein the reference voltage is provided by a reference voltage providing circuit, which comprises a stabilizing diode and two resistors connected in series, the two resistors connected with the stabilizing diode in parallel, the reference voltage output by a common terminal of the two resistors.

11. The fan speed controlling circuit as described in claim 9, wherein the first amplifier is connected to the negative terminal of the second amplifier via a fourth resistor, and the output terminal of the second amplifier connected to the negative terminal thereof via a fifth resistor.

12. The fan speed controlling circuit as described in claim 9, wherein a grid electrode of the MOSFET is connected to the output terminal of the third amplifier, a drain electrode of the MOSFET is connected to a power source, a source electrode of the MOSFET is connected to ground via a sixth resistor and a seventh resistor.

13. The fan speed controlling circuit as described in claim 12, wherein the sixth resistor and the seventh resistor are connected in series, and simultaneously output the driving current to the fan.

14. The fan speed controlling circuit as described in claim 12, wherein a common terminal of the sixth resistor and the seventh resistor is connected to the positive terminal of the third amplifier for sending the feedback voltage thereto.

15. A fan speed controlling circuit, comprising:
a temperature sensing circuit for transforming a temperature signal to a voltage signal;
a reference voltage providing circuit for outputting a reference voltage;
a voltage amplifying and comparing circuit comprising a negative terminal receiving the voltage signal from the temperature sensing circuit and a positive terminal receiving the reference voltage from the reference voltage providing circuit, the voltage amplifying and comparing circuit further comprising a second amplifier, a resistor connected to the negative terminal of the second amplifier and a resistor connected between an output terminal and the negative terminal of the second amplifier; and
a reactive circuit connected to the voltage amplifying and comparing circuit, the reactive circuit producing a control signal according to a voltage signal output by the voltage amplifying and comparing circuit, the reactive circuit comprising a driving component controlled by the control signal for providing a driving current to a fan.

* * * * *